United States Patent
Bartel

(10) Patent No.: US 7,471,996 B2
(45) Date of Patent: Dec. 30, 2008

(54) CONTROL SYSTEM FOR AN AIRCRAFT ENGINE

(75) Inventor: Matthias Bartel, Erkner (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 696 days.

(21) Appl. No.: 10/875,684

(22) Filed: Jun. 25, 2004

(65) Prior Publication Data

US 2004/0267414 A1 Dec. 30, 2004

(30) Foreign Application Priority Data

Jun. 25, 2003 (DE) ................. 103 29 252

(51) Int. Cl.
*G06F 7/00* (2006.01)

(52) U.S. Cl. .................. 701/4; 701/7; 701/3; 60/200.1; 244/53 B

(58) Field of Classification Search ...... 701/3, 701/4, 7; 60/200.1, 39.29; 244/53 B
See application file for complete search history.

(56) References Cited

U.S. PATENT DOCUMENTS

| | | | | |
|---|---|---|---|---|
| 5,175,710 A * | 12/1992 | Hutson | ..................... | 367/135 |
| 5,315,819 A * | 5/1994 | Page et al. | ............... | 60/39.282 |
| 5,349,527 A * | 9/1994 | Pieprzak et al. | ............... | 702/17 |
| 5,586,026 A * | 12/1996 | Highnam et al. | ............... | 702/17 |
| 5,694,760 A * | 12/1997 | Baxter | ..................... | 60/773 |
| 5,732,546 A * | 3/1998 | Pineo et al. | ..................... | 60/773 |
| 5,832,475 A * | 11/1998 | Agrawal et al. | ................. | 707/2 |
| 5,890,151 A * | 3/1999 | Agrawal et al. | ................. | 707/5 |
| 5,926,820 A * | 7/1999 | Agrawal et al. | ............. | 707/200 |
| 5,978,788 A * | 11/1999 | Castelli et al. | ................. | 707/2 |
| 6,209,821 B1 * | 4/2001 | Gary | ..................... | 244/53 B |
| 6,341,247 B1 * | 1/2002 | Hreha et al. | ..................... | 701/3 |
| 6,389,816 B1 * | 5/2002 | McCarty et al. | ............... | 60/773 |
| 6,748,744 B2 * | 6/2004 | Peplow et al. | ................. | 60/773 |
| 6,778,884 B2 * | 8/2004 | Chapman et al. | ............... | 701/3 |
| 6,853,452 B1 * | 2/2005 | Laufer | ........................ | 356/436 |
| 6,885,923 B1 * | 4/2005 | Faymon et al. | ................ | 701/29 |
| 6,978,597 B2 * | 12/2005 | McKelvey et al. | ....... | 60/39.281 |

(Continued)

FOREIGN PATENT DOCUMENTS

EP  0 363 301 A1  4/1990

(Continued)

OTHER PUBLICATIONS

German Search Report dated Jun. 25, 2003.

*Primary Examiner*—Thomas G. Black
*Assistant Examiner*—Wae Louie
(74) *Attorney, Agent, or Firm*—Timothy J. Klima

(57) ABSTRACT

In an electronic control system, three-dimensional data sets (data cubes L11-L14) for different power-limiting engine parameters are stored at different engine ratings for setting a respective maximum engine power in relation to flight altitude (ALT), ambient temperature (DTAMB) and flight Mach number (MN) to separately calculate a maximum power corresponding to each parameter. For power reduction due to air bleed, corresponding separate data cubes (L21-L24) are stored. In a comparator, the respective smallest power reduction value is determined and, subsequently, the fuel supply is set according to that power reduction value. Under conforming boundary conditions, the same data cubes (L24) can be stored for different engine ratings. The system requires low storage capacity and low calculating effort.

20 Claims, 2 Drawing Sheets

U.S. PATENT DOCUMENTS

| | | | |
|---|---|---|---|
| 7,007,485 B2 * | 3/2006 | Pashley et al. | 60/773 |
| 7,058,640 B2 * | 6/2006 | Le | 707/100 |
| 7,120,535 B2 * | 10/2006 | Rahman et al. | 701/114 |
| 7,194,392 B2 * | 3/2007 | Tuken et al. | 703/2 |
| 2003/0229427 A1 * | 12/2003 | Chapman et al. | 701/3 |
| 2004/0267414 A1 * | 12/2004 | Bartel | 701/4 |
| 2005/0076036 A1 * | 4/2005 | Le | 707/100 |
| 2005/0154727 A1 * | 7/2005 | O'Halloran et al. | 707/8 |
| 2006/0156967 A1 * | 7/2006 | You et al. | 116/4 |

FOREIGN PATENT DOCUMENTS

| | | |
|---|---|---|
| EP | 0 427 952 A | 5/1991 |
| WO | 9312331 | 6/1993 |

* cited by examiner

CONTROL SYSTEM FOR AN AIRCRAFT ENGINE

This application claims priority to German Patent Application DE10329252.7 filed Jun. 25, 2003, the entirety of which is incorporated by reference herein.

BACKGROUND OF THE INVENTION

This invention relates to an electronic engine control system for setting a max. possible power on the basis of the flight condition data stored in a data cube for various engine ratings and a variety of power-limiting thermodynamic and mechanical engine parameters.

The maximum power provided by an aircraft engine without transgression of its thermal and mechanical loadability depends essentially on the respective flight condition which is adequately defined firstly by the flight altitude, secondly by the ambient temperature and thirdly by the flight Mach number. An important, power-limiting thermodynamic engine parameter for the power control of aircraft engines is the turbine gas temperature which is known to be applied such that—on the basis of a constant flight Mach number and a constant ambient pressure—a maximum thrust is determined which corresponds to the respective ambient air temperature, but is limited by the critical turbine gas temperature. Since, however, engine power is sufficiently high in a low ambient temperature range and since the maximum thrust limited by the turbine gas temperature is only achieved at a certain ambient temperature level and decreases continually from this kink point, the respective data will be used for power control. This means that the max. permissible turbine gas temperature, as a critical thermodynamic engine parameter, the maximum thrust, which remains constant in a low ambient temperature range up to a certain ambient temperature level (flat-rated thrust), and the kink point are determined individually for various engine ratings—take-off, climb, cruise or engine failure. This situation is shown in FIG. 3 of the illustration.

For power control via fuel supply, one function generator is provided for each engine rating, starting out from a certain setting of the power lever, actually in dependence of the flight condition defined by flight altitude, flight Mach number and ambient temperature, as described in Specification U.S. Pat. No. 5,315,819, for example. The function generators are fed with input signals for flight altitude, Mach number and ambient temperature. Corresponding output signals are supplied in response to the respective input signal, with the output signals changing with the flight condition. Each function generator comprises a three-dimensional table (data cube) whose functional range is defined by the flight Mach number (MN), the ambient temperature in the form of the difference from the ISA temperature (DTAMB), and the flight altitude (ALT) in the form of a flight altitude-related pressure. See FIG. 1. The three-dimensional table shows a target power based on the input signals for Mach number, flight altitude and ambient temperature, with each function generator performing a triple interpolation if the input signals fall between the values unambiguously defined by the table (supporting points) in order to derive the corresponding target power (target torque). For example, data are filed in the data cube related to the respective engine rating such that tables are created for different flight altitudes which map the Mach number as a function of the ambient temperature. For programming reasons, all altitude tables must, however, have exactly the same supporting points (discrete values) between which interpolation for the determination of intermediate power values must be made if the input signals for ambient temperature, Mach number and flight altitude depart from the supporting points. These specified interpolation rules are robust, reliable calculation routines which ensure a certain degree of safety.

With the above-described control system, the thrust curve is unambiguously defined by a minimum of three supporting points, actually the coldest day, the kink point and the hottest day, provided that the maximum thrust is determined on the basis of only one power limiter, here the turbine gas temperature, in relation to the ambient temperature at constant Mach number and flight altitude. Assuming a constant distribution of the supporting points over Mach number and flight altitude, the number of supporting points can accordingly be kept small. With exactly one kink point for all flight altitudes being defined for each engine rating and one power limiter, the number of data points stored in a data cube lies within narrow, controllable limits as regards storage effort and storage capacity. If, however, under the aspect of maximum engine performance at any flight condition, several power-limiting parameters are to be applied and, consequently, the kink point is not defined firmly, the number of supporting points stored in the data cube must, on the basis of permissible calculation routines in connection with the required equality of the supporting points, be many times higher to exactly define the kink point to prevent the engine from exceeding its thermodynamic and mechanical load limits and to enable the engine to deliver the desired high power. The high quantity of data entails, however, many times the capacity of very costly data storage. Also, the calculation effort is increased significantly and is so time-consuming that the safety of the flight is no longer ensured. The processing effort for the creation of the data cubes required for each engine rating is high, this effort also being necessary each time a limiting parameter is changed.

BRIEF SUMMARY OF THE INVENTION

In a broad aspect, the present invention provides a control system for the provision of maximum engine power on the basis of a variety of power-limiting engine parameters which, with the data quantity being reduced, requires a small storage capacity and, and for the purpose under the aspect of safety, a short calculating time.

It is a particular object of the present invention to provide solution to the above problems by a control system designed in accordance with the features described herein. Further objects and advantages of the present invention will become apparent from the description below.

For setting a max. possible engine power with an electronic control system, three-dimensional data sets (data cubes) are prepared and stored in the control system on the basis of a variety of power-limiting parameters for each of these power limiters, in relation to flight altitude, ambient temperature and flight Mach number. From the maximum power values calculated according to the data cubes on the basis of the input signals corresponding to the flight condition at the respective engine rating for each engine parameter, the lowest value will be determined in a comparator and the fuel supply to the engine controlled on the basis of this value. Separate data storage and separate calculation of the max. possible engine power on the basis of one power limiter each enables the storage capacity and the time effort for the determination of the max. possible power as well as the effort for the creation of new data sets, or of data sets to be modified due to subsequent changes of engine parameters, to be reduced considerably. This results in a significant cost savings and an increase in safety.

A further reduction of the processing, storage and calculation effort results from the fact that, in a further development of the present invention, one and the same data set for a shaft speed and/or compressor pressure ratio limit can, under the same boundary conditions, be used jointly at different engine ratings. This is also applicable to any other limiting parameters and depends on the respective application.

In addition, for maximum power utilization, second three-dimensional data sets (data cubes) are, in accordance with a further feature of the present invention, stored in the control system at each engine rating and for each power-limiting thermodynamic and/or mechanical power limiter which immediately take account of any reduction of the maximum power determined with the first data cube (three-dimensional data set) due to bleeding of cabin and anti-icing air. This means that the respective power is only reduced if air bleeding does result in a transgression of a max. limiting and flight condition-relevant limiter. As long as the flight power calculated by the control does not affect any limiter, the full warranted power of the engine can be made available under the condition of air bleed.

In a further development of the present invention, a constant maximum power value is stored in the control system for each engine rating which maps the max. warranted engine power for each condition of flight.

BRIEF DESCRIPTION OF THE DRAWINGS

The present invention is more fully described in the light of the accompanying drawings showing a preferred embodiment. In the drawings.

DETAILED DESCRIPTION OF THE INVENTION

Figure 3:
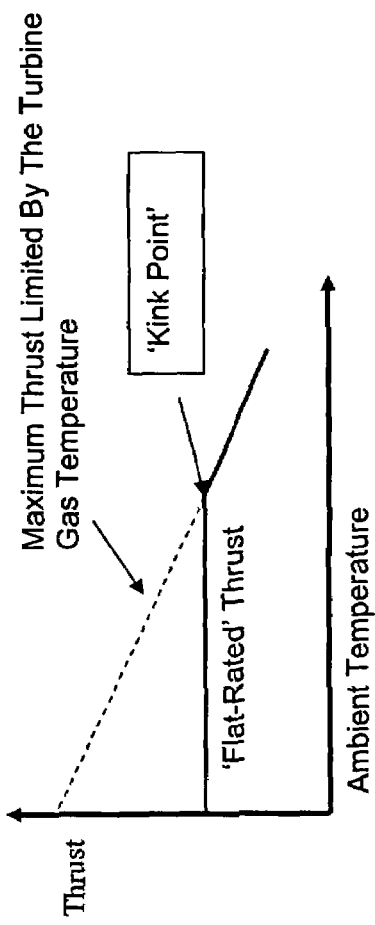
FIG. 3 is a schematic representation of the thrust curve as a function of the ambient temperature taking into account the turbine gas temperature as a limiting parameter.
Figure 1:
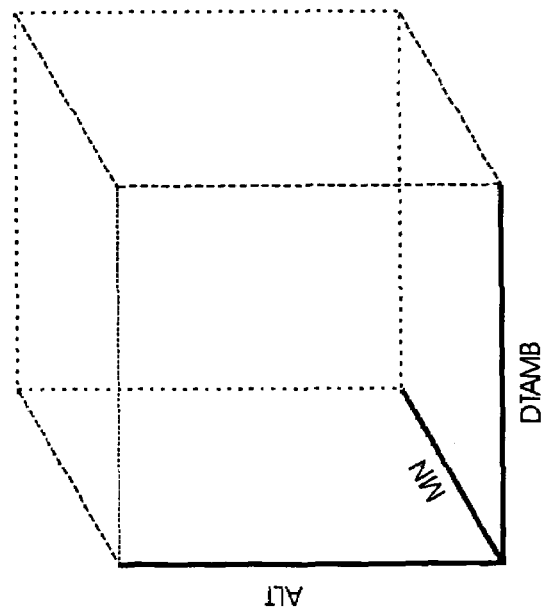
FIG. 1 is a schematic representation of a data cube (three-dimensional data table) deposited in the electronic engine control (EEC)
Figure 2:
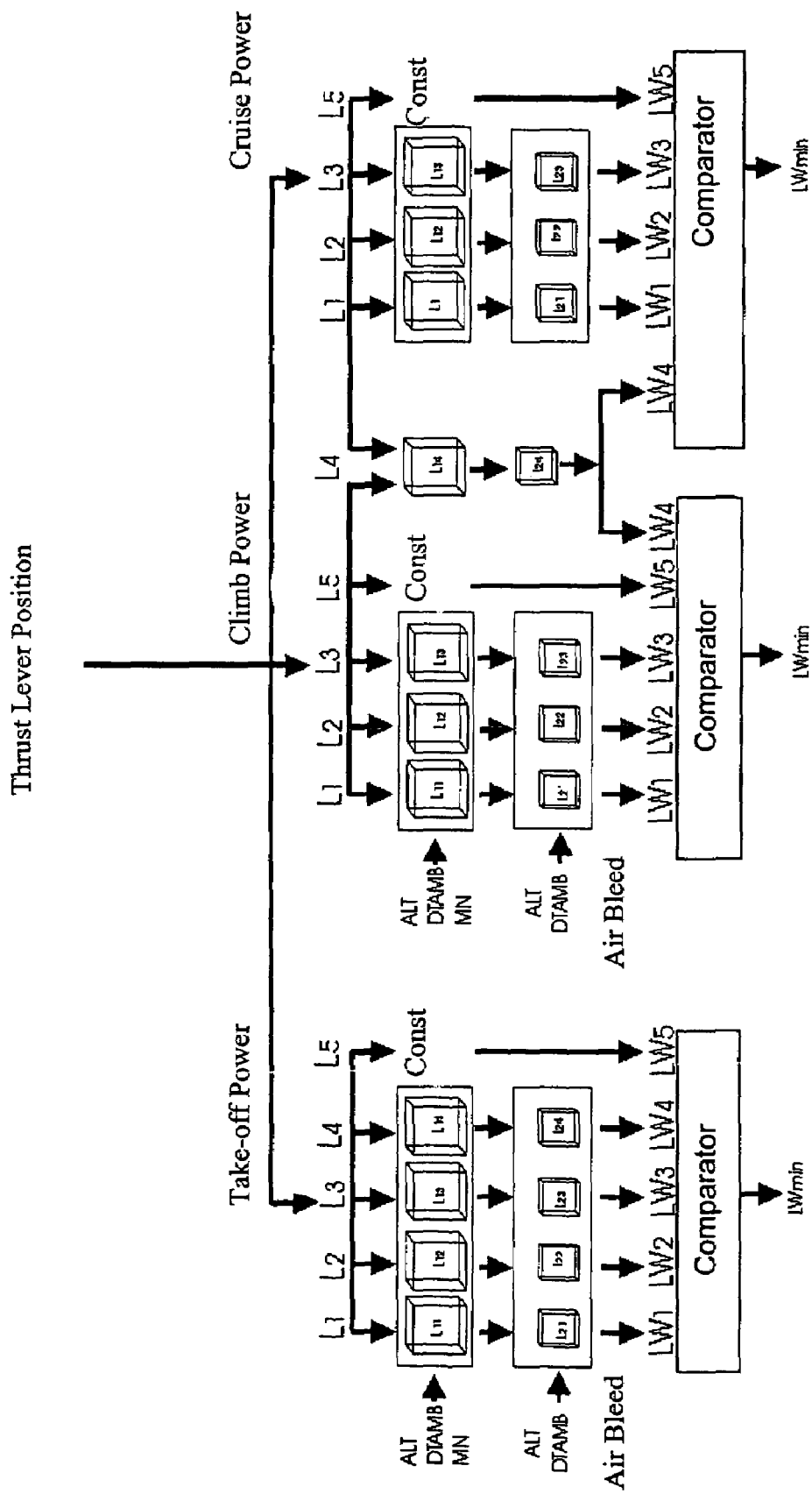
FIG. 2 is a control system designed in accordance with the present invention for warranting a maximum engine power.

According to FIG. 2, power is controlled at the various engine ratings—take-off, climb and cruise—on the basis of the pilot's power lever setting. In the data cube illustrated in FIG. 1, a data set or data cube is shown for a certain rating for different flight altitudes (ALT), each related to a certain pressure,
ambient temperatures, as a difference from the ISA temperature (DTAMB), and
flight Mach numbers (MN).

As shown in FIG. 2, such three-dimensional data tables, namely the first data cubes L11 to L14, are, in the present version, deposited in the memory of the electronic engine control (EEC) for four power-limiting parameters (limiters L1 to L4) and actually, in the present embodiment, for three different engine ratings, here take-off, climb and cruise, these power-limiting parameters, which are specified for a certain altitude and which shall not be exceeded, being here a maximum turbine gas temperature (L1)
a maximum high-pressure shaft speed (L2)
a maximum high-pressure compressor pressure ratio (L3), and
a maximum intermediate-pressure shaft speed (L4).

a further engine rating, maximum power in the case of an engine failure can be included. Take-off power has the highest value and cruise power the lowest value, with climb power lying in between. Distribution of the first data cubes L11 to L14 to the respective power-limiting parameters (L1 to L4) enables, as compared to a data cube common to all power limiters (L1 to L4), the required data quantity and the corresponding calculating effort, owing to the reduction of supporting points effected by the continuous, linear characteristics in each data cube, to be reduced significantly, and, under safety aspects, the calculating speed to be increased correspondingly with the calculating routines specified for safety reasons for the determination of the maximum power on the basis of the flight condition-related input signals. The more power-limiting parameters that are used, the more the data quantity can be reduced. In the case of the four power limiters used in the embodiment shown, splitting to one data cube each enables approximately 90 percent of the otherwise required data to be saved. Data cubes for other power-limiting parameters can be prepared with low effort and included in the control system. Similarly, the effort for the preparation of a data cube required by a change of a power limiting parameter is significantly lower than the effort for the creation of a new data cube comprising all power limiters.

Each individual (first) data cube L11, L12, L13 and L14 prepared at the three specified engine ratings for the various power-limiting parameters—each at the same engine rating and each for the same power-limiting engine parameter (limiters L1 to L4)—is immediately followed by a further (second) data cube L21, L22, L23 and L24, namely an air bleed data cube, which, in the control system, takes account of a temperature and speed-increasing cabin air bleed at the high-pressure compressor by power reduction (bleed debit). The auxiliary data cube L21 to L24 in the embodiment as per FIG. 2 comprises data related to flight altitude (ALT), ambient temperature (DTAMB) and air bleed. Since the data cubes for auxiliaries L21 to L24 are immediately allocated to the first data cubes L11 to L14, power reduction of the engine need not be effected wholesale, but only if the critical value of the respective power-limiting parameter is actually reached or exceeded when air is bled for aircraft auxiliaries. This control measure also helps to achieve the max. possible engine power.

As shown in FIG. 2, a maximum power limiter L5 is stored at each engine rating which is constant, independently of the flight condition, and which represents a warranted maximum power. For the ratings "cruise" and "climb", FIG. 2 furthermore illustrates that the present control system also enables the same first and second data cube, here L14 and L24, for example, to be used for two or more engine ratings. This applies, in the present embodiment, to the maximum intermediate-pressure shaft speed (L4), which is the same for the respective engine ratings. It may similarly apply to the limiting parameters "high-pressure speed" or "compressor pressure ratio" as well as to other parameters. Thus, the required storage capacity as well as the effort necessary for the preparation of the data cubes is reduced further.

With the setting of the power lever as input parameter, a corresponding (max. possible) power value LW1 to LW4, which, if applicable, is corrected for air bleed power take-off, is read out with the first and second data cubes corresponding to the flight condition (flight altitude, ambient temperature, flight Mach number) at the respective engine rating for each power-limiting parameter. These power values LW1 to LW4, together with the power value LW5 provided by the maximum power limiter L5, are input in a comparator V which selects the smallest (critical) power value as final power output of the control system, applying this value to set the max. possible power of the engine via control of the fuel supply.

What is claimed is:

1. A control system for an aircraft engine for setting a max possible power on the basis of flight condition data stored in a data cube for various engine ratings and a variety of power-limiting thermodynamic and mechanical engine parameters, comprising a unique data cube stored for each power-limiting engine parameter for calculating a respective maximum power for that power-limiting engine parameter, and a comparator provided downstream of the data cubes for determining the respective smallest power value of the power values output by the plurality of data cubes ($LW_{min}$) and selecting that respective smallest power value as a control value for electronic control of the fuel supply.

2. A control system in accordance with claim 1, and further comprising a second data cube allocated to each first data cube, the second data cube providing an additional reduction of power value determined by an amount of aircraft air bleed, with the lower of the output of the first data cube and an output of the second data cube being input into the comparator.

3. A control system in accordance with claim 2, wherein the second data cube provides an additional reduction of power value only when a critical value of the respective power-limiting engine parameter is met or exceeded due to an amount of the bleed air.

4. A control system in accordance with claim 3, wherein the respective first data cube is based on a flight altitude, an ambient temperature and a flight Mach number, and the respective second data cube is based on the flight altitude, the ambient temperature and aircraft cabin air bleed.

5. A control system in accordance with claim 4, wherein the power limiting factors considered include a turbine gas temperature, a high-pressure shaft speed, an intermediate-pressure shaft speed, a high-pressure compressor pressure ratio and a constant maximum power fed directly into the comparator.

6. A control system in accordance with claim 5, wherein, under conforming boundary conditions regarding intermediate-pressure speed, high-pressure shaft speed and/or high-pressure compressor pressure ratio, the respective individual data cubes are used for more than one engine rating.

7. A control system in accordance with claim 2, wherein the respective first data cube is based on a flight altitude, an ambient temperature and a flight Mach number, and the respective second data cube is based on the flight altitude, the ambient temperature and aircraft cabin air bleed.

8. A control system in accordance with claim 7, wherein the power limiting factors considered include a turbine gas temperature, a high-pressure shaft speed, an intermediate-pressure shaft speed, a high-pressure compressor pressure ratio and a constant maximum power fed directly into the comparator.

9. A control system in accordance with claim 8, wherein, under conforming boundary conditions regarding intermediate-pressure speed, high-pressure shaft speed and/or high-pressure compressor pressure ratio, the respective individual data cubes are used for more than one engine rating.

10. A control system in accordance with claim 1, wherein the power limiting factors considered include a turbine gas temperature, a high-pressure shaft speed, an intermediate-pressure shaft speed, a high-pressure compressor pressure ratio and a constant maximum power fed directly into the comparator.

11. A control system in accordance with claim 1, wherein, under conforming boundary conditions regarding intermediate-pressure speed, high-pressure shaft speed and/or high-pressure compressor pressure ratio, the respective individual data cubes are used for more than one engine rating.

12. A control system in accordance with claim 1, wherein the various engine ratings include at least two of the group of takeoff power, climb power and cruise power.

13. A control system in accordance with claim 12, wherein the various engine ratings include all three of the group of take-off power, climb power and cruise power.

14. A control system in accordance with claim 1, wherein the power limiting factors considered include a high-pressure shaft speed.

15. A control system in accordance with claim 1, wherein the power limiting factors considered include an intermediate-pressure shaft speed.

16. A control system in accordance with claim 1, wherein the power limiting factors considered include a high-pressure compressor pressure ratio.

17. A control system in accordance with claim 1, wherein the power limiting factors considered include a constant maximum power fed directly into the comparator.

18. A control system in accordance with claim 1, wherein the power limiting factors considered include at least two of the group of a high-pressure shaft speed, an intermediate-pressure shaft speed, a high-pressure compressor pressure ratio and a constant maximum power fed directly into the comparator.

19. A control system in accordance with claim 1, wherein the power limiting factors considered include at least three of the group of a high-pressure shaft speed, an intermediate-pressure shaft speed, a high-pressure compressor pressure ratio and a constant maximum power fed directly into the comparator.

20. A control system in accordance with claim 1, wherein the power limiting factors considered include a high-pressure shaft speed, an intermediate-pressure shaft speed, a high-pressure compressor pressure ratio and a constant maximum power fed directly into the comparator.

* * * * *